United States Patent [19]

Brown

[11] 4,183,386

[45] Jan. 15, 1980

[54] UNIVERSAL INDUSTRIAL SPEED NUT

[76] Inventor: Robert M. Brown, 6545 SW. 129 Ter., Miami, Fla. 33156

[21] Appl. No.: 940,961

[22] Filed: Sep. 11, 1978

[51] Int. Cl.² .......................... F16B 35/04; F16B 37/04
[52] U.S. Cl. .................................... 151/41.7; 85/3 R
[58] Field of Search ................ 151/41.7; 85/3 R, 3 K, 85/3 S, 32 K, 80; 248/205 A

[56] References Cited

U.S. PATENT DOCUMENTS

| | | | |
|---|---|---|---|
| 2,765,134 | 10/1956 | Hill | 151/41.7 X |
| 3,473,431 | 10/1969 | King | 85/3 R |
| 3,524,489 | 8/1970 | King | 85/3 R X |
| 3,802,476 | 4/1974 | Hoadley | 151/41.7 |
| 4,075,924 | 2/1978 | McSherry et al. | 151/41.7 X |

*Primary Examiner*—Ramon S. Britts

[57] ABSTRACT

A fastening device including an elongated nut provided with a central screw threaded opening, a flexible line including a small disc formed on an inner end thereof, a finger grip portion on an outer end and a pre-centering intermediate portion including a central pin for engagement through a hole in the central span portion of a cover strip for the outside surfaces of a pair of double-sided pressure highly sensitive adhesive foam tape portions secured to opposed end portions of the nut. A resilient centering member is engaged in the screw threaded nut opening with a tail portion of the flexible line passing therethrough, whereby the nut in assembly on the tail portion of the line may be inserted completely through a properly sized hole in a wall plate or sheet material, for example, and a single pull administered by one finger inserted through the finger grip portion will remove the cover strip from the double-sided foam tape, resulting in the nut being secured to a blind inside wall plate or sheet material by means of the foam tape, and the complete removal of the flexible line, cover strip and centering member.

10 Claims, 14 Drawing Figures

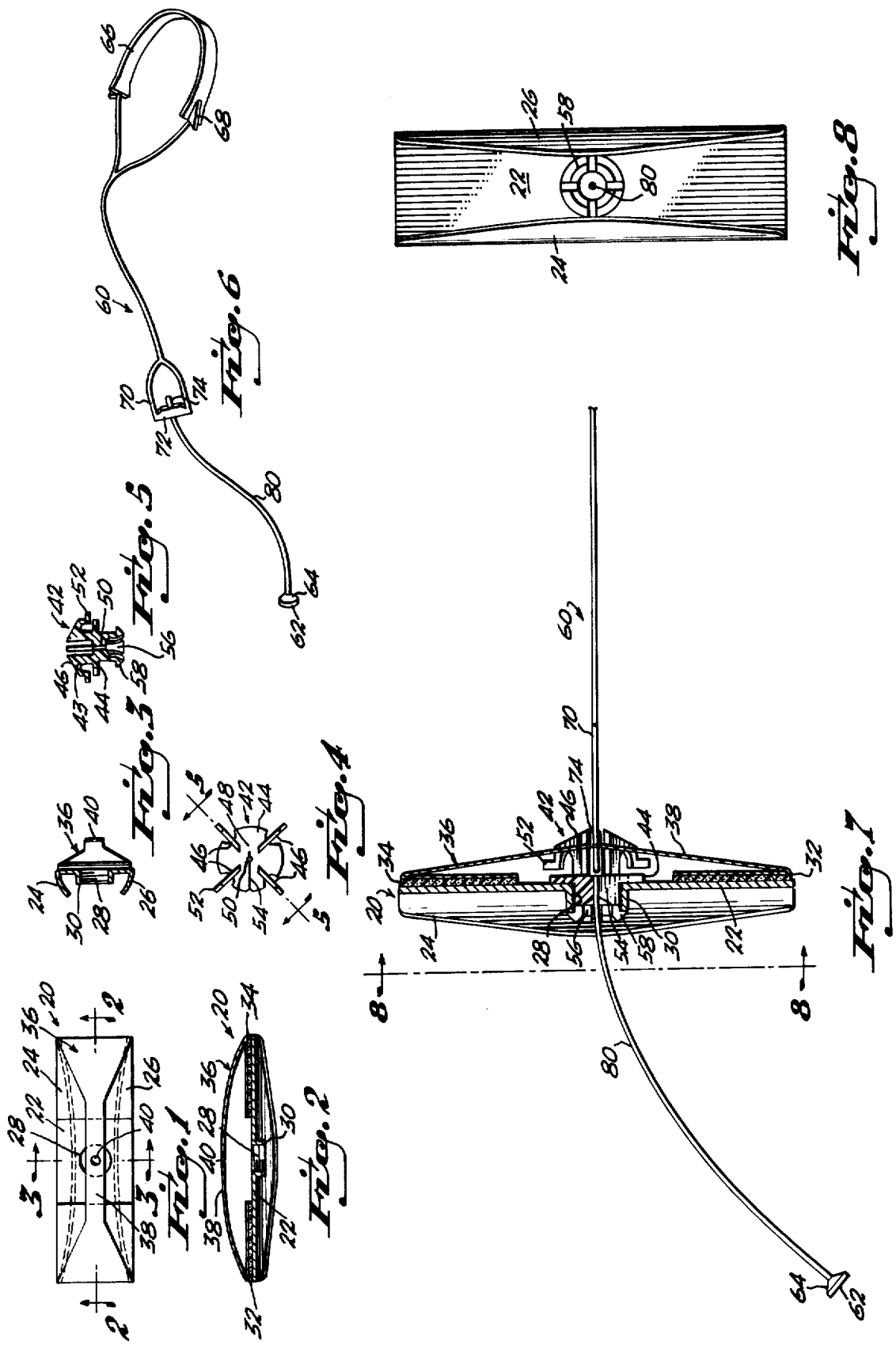

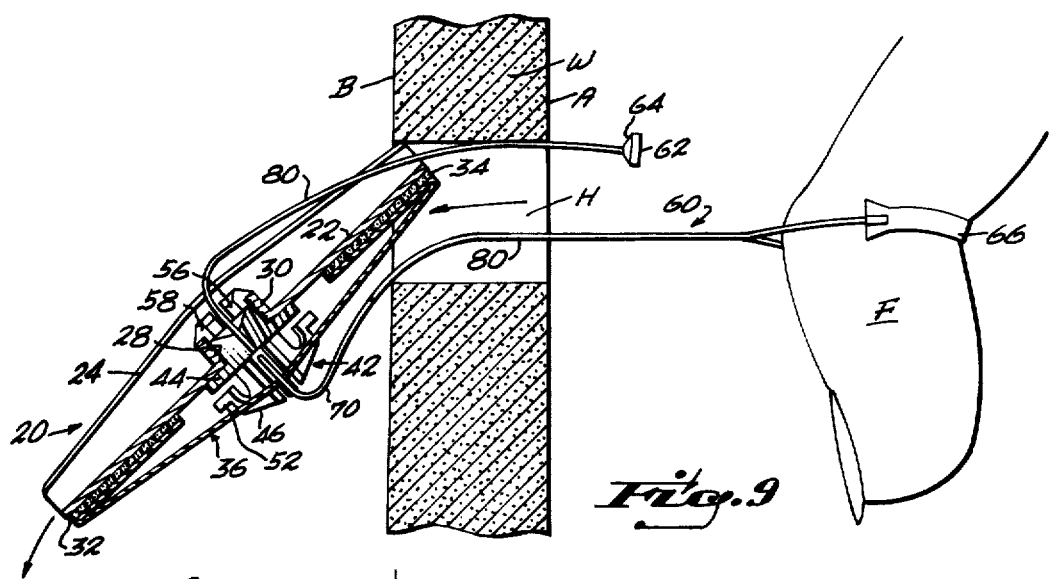
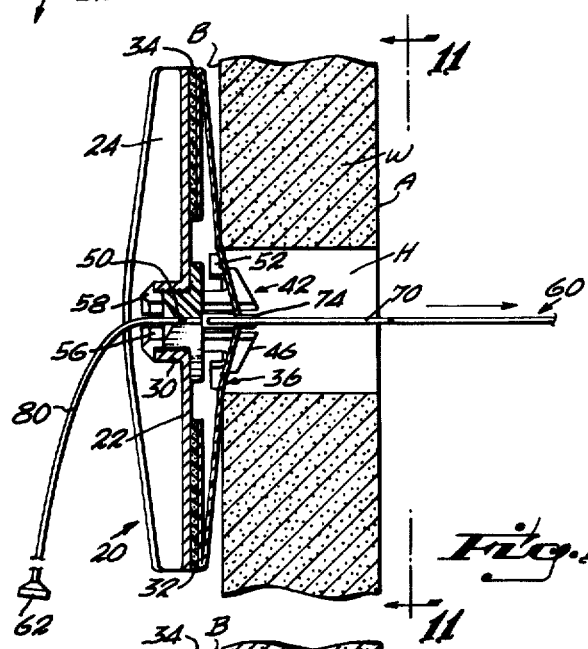
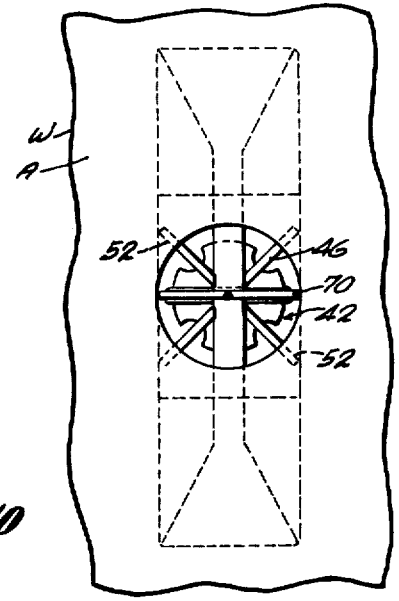
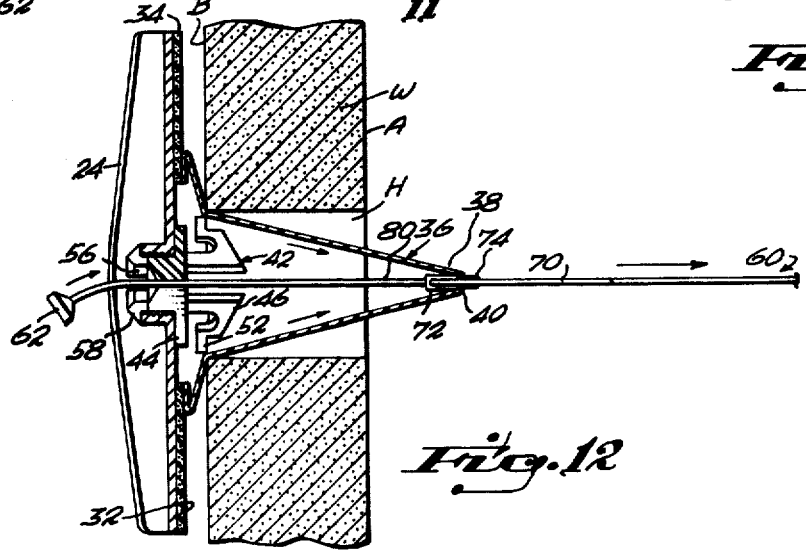

UNIVERSAL INDUSTRIAL SPEED NUT

BACKGROUND OF THE INVENTION

The present invention pertains to a fastening device for an adhesive attachment to the back of a wall, plate or sheet on a normally inaccessible blind side through an access hole.

The present invention pertains to a fastening device for use in the fiberglass boat industry, aircraft and automotive production, mobile home production, sheet metal industry and others including household use. It is a labor-saving device that can be quickly installed in a far ranging variety of conditions and materials in new production or in the repair industry.

This fastener is installed through its access hole from the front and is held in place with adhesive. Therefore, it can even be used in blind applications where no access to back of the hole exists. No tools are required for its installation.

The most widely used devices of this nature are sold under the trade names of "Toggle Bolt" and "Molly". These devices while successful in some applications are often difficult and time-consuming to install by the unskilled and in many cases result in failure. They require a large space behind the wall to be usable. Outside walls in concrete or cinder block construction where firing strips are used limit the access space between block and wall and often make use of these fasteners impractical if not impossible. In the case of a "Toggle Bolt" a properly sized hole is formed in a wall or ceiling and the screw, with the nut threaded thereon, is inserted through the hole. The wings of the nut collapse against the spring pressure and lie along opposite sides of the outer end portion of the screw during the insertion through the hole. As the wings are of a substantial length, the nut must be engaged on the tip end of the screw during the insertion because said wings must clear the inside edge of the hole before they open under the spring pressure.

It is essential, therefore, that the screw be immediately turned in the proper direction for tightening purposes.

As ceiling and side wall hanging operations are often in the hands of women, it frequently happens that the screw is turned in the wrong direction for a very short distance, resulting in the separation of the wing nut from the screw and the nut is obviously inaccessible for a second chance.

Further disadvantages of this type of attaching device are first, the item or object being suspended from the screw, on some occasions, must be engaged around the screw prior to its insertion through the wall or ceiling hole, and second, once installed, the screw cannot be removed without losing the nut.

The "Molly" has a collapsible tubular construction and a very long threaded screw which when used properly will clamp into a hole in a wall; but a very large space behind the wall is required and the clamping action is attained only by a time-consuming effort with a screwdriver.

The present invention makes use of the recent development of extremely strong pressure sensitive adhesive materials used extensively in the automotive and other industries for permanent all-weather joining of objects or assemblies and once the access hole is properly sized no tool is required for installation.

The fastening device of the present invention provides means to secure a nut to the normally inaccessible inside or blind surface of a hollow side wall or ceiling, boat hull or deck, sheet metal assembly, etc., for example, without being in assembly with a bolt or screw. Therefore, the screw or bolt may be, at any desired time, threaded into the nut. Also, the screw or bolt may be removed as often as desired and the nut will remain secured in position for its reception. Thus, for example, stripped threads in fiberglass or metal may be repaired simply by drilling out the stripped threads to the proper size hole and installing this threaded fastener.

Therefore, one of the principal objects of the present invention is to provide a fastening nut for fixed engagement with an inside or blind surface of a side or ceiling wall, for example.

A further object of the present invention is to provide means to engage and secure the nut to nearly any surface and in production work including blind installations.

Another object of the instant invention is to provide a flexible line including centering means thereon engaged with the nut for passage inwardly through a properly sized hole in a wall and finger grip means on an outer end of the flexible line to draw the nut into engagement with a surface including inaccessible surfaces of a wall.

Yet another object of the invention is to provide double-sided pressure sensitive adhesive tape on the nut in a position to adhesively secure the nut to the inside wall or surface relative to the hole in the wall.

A still further object of the present invention is to provide a cover strip on the outer side of the adhesive tape and means to engage the cover strip in a manner whereby said cover strip is removed along with the centering means and flexible line when a sufficient degree of pull forces are applied to the flexible line by means of the finger grip portion.

BRIEF DESCRIPTION OF THE DRAWINGS

FIG. 1 is a plan view of a front side of the fastening nut incorporated in the present invention;

FIG. 2 is a longitudinal sectional view taken along line 2—2 of FIG. 1;

FIG. 3 is a transverse sectional view taken along line 3—3 of FIG. 1;

FIG. 4 is a plan view of a first or outer side of a nut centering means incorporated in the present invention;

FIG. 5 is a cross sectional view taken along line 5—5 of FIG. 4;

FIG. 6 is a perspective view of a flexible nut mounting line incorporated in the present invention;

FIG. 7 is a longitudinal sectional view of the assembled nut centering means engaged on the flexible line of FIG. 6;

FIG. 8 is a view taken along the plane indicated by the line 8—8 of FIG. 7 and looking in the direction of the arrows;

FIGS. 9 through 14 illustrate, in cross section, the sequential operation of the device from the insertion of the nut to the blind side of the wall in axial alignment with the hole, and removal of the flexible line, tape covering strip and centering means.

DETAILED DESCRIPTION OF A PREFERRED EMBODIMENT

Figure 13:
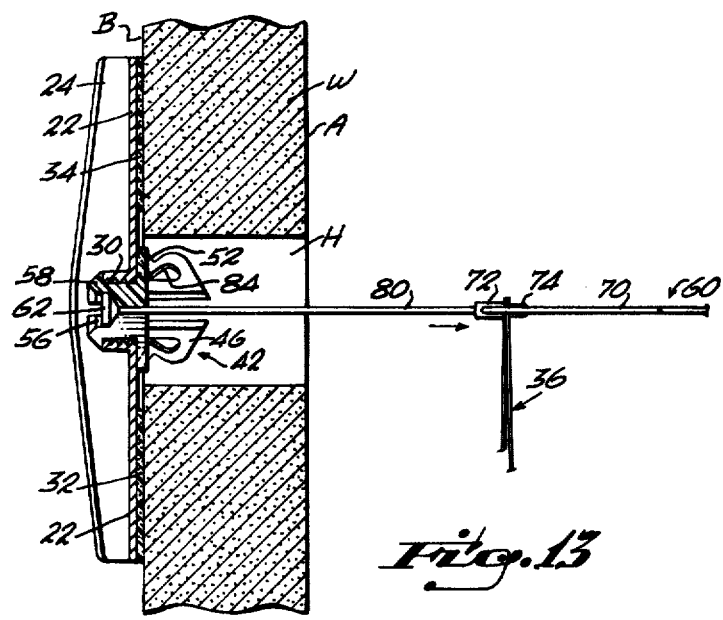

With reference to the drawings in which like reference characters designate like or corresponding parts throughout the various views and with particular reference to FIG. 1, a nut assmebly, generally designated 20, includes a base plate portion 22 with a pair of rearwardly extending arcuate stiffener flanges 24 and 26. A centrally positioned hole 28 is defined by a rearwardly extending, interiorly screw threaded tubular portion 30. As illustrated, the face plate portion 22 is substantially elongated relative to its width and has secured thereto on its opposed outer end face portions a pair of double-sided pressure sensitive adhesive foam tape portions 32, 34 spanned by a single cover strip 36 engaged on the outer adhesive surfaces thereof, and connected by a reduced width span portion 38 provided with a central hole 40.

FIGS. 4 and 5 illustrate a centering plug 42 including a main body portion 43 and an enlarged peripheral flange 44 with four equally spaced apart, radially extending forwardly inwardly tapered fins 46 defining a central open area 48. A through hole 50 is provided axially through the centering plug 42 and the fins 46 terminate at their outer radii in relative thin coplanar, radially extending flexible feet 52. An access slot 54 opens into hole 50. At its inner end, the centering member 42 is provided with an axial socket 56, defined by a plurality of flexible angular retainer fingers 58.

With reference to FIG. 6, a nut mounting means in the form of an elongated flexible nut mounting line indicated generally at 60 is provided for installation of nut 20 in a manner to be hereinafter described. Line 60 includes a small disc or button 62 with a beveled peripheral surface 64 on its inner end, and a flattened finger grip loop 66 at its outer end. A pair of opposed laterally extending fins 68 are provided on the loop 66 to prevent its accidentally slipping through a hole H in the wall during the nut installation. Intermediate its length, a bifurcated portion 70 is provided to define a pre-centering means for a purpose to be subsequently described. The bifurcated portion terminates in a transverse member 72 provided with a forwardly extending central pin 74 in axial alignment with the line 60.

In assembly, FIG. 7, a tail portion 80 of flexible line 60 is engaged through access slot 54 into center hole 50 of the centering plug 42 with the fins 46 thereof directed toward the finger grip 66. The flexible fingers 58 are press fitted through the screw threaded tubular hole 28 of nut 20 and the pin 74 is engaged through the central hole 40 of the cover strip span 38.

In a commercial form, the device will be marketed in the assembled condition of FIG. 7, ready for use.

FIGS. 9 through 14 illustrate the various steps in the securing of a nut 20 to the blind side B of a wall W provided with a preformed properly sized hole H therethrough. As illustrated in FIG. 9, a finger F is engaged through loop 66 and the nut assmebly 20 with the tail portion 80 is inserted through hole H from the accessible side A of wall W.

It should be here noted that the steps illustrated in FIGS. 10, 12, 13, and 14 are accomplished by one relatively short pulling movement of the flexible mounting line 60 but will be described relative to the individual views. Because tail portion 80 of line 60 fits snuggly in hole 50 of the centering plug 42, as seen in FIG. 10, the nut 20 will be pulled substantially into axially alignment with hole H when the pulling movement is initiated. This is accomplished by the pre-aligning bifurcated portion 70. As the aligning plug 42 enters hole H, the tapered fins 46 accomplish the final axial positioning of the nut 20 relative to said hole H and the feet 52, as best illustrated in FIG. 11, overlie the peripheral surface of the blind wall surface B and arrest the movement of the nut 20 a short distance inwardly of the surface B to permit the cover strip 36 to be peeled from the outer adhesive surfaces of the double-sided pressure sensitive foam tape portions 32, 34.

FIG. 12 illustrates the peeling operation. With the hole 40 in the cover strip span portion 38 engaged on pin 74, the complete peeling operation is accomplished by a second phase of the pull movement.

As illustrated in FIG. 13, a third phase of the pull movement causes the disc 62 to seat in socket 56, transmitting all of the pull forces to the nut 20, resulting in the extended feet 52 being flexed inwardly as at 84, permitting the double-sided pressure sensitive tape portion 32, 34 to engage and firmly adhere to the blind wall surface B under the influence of the pull forces.

Figure 14:
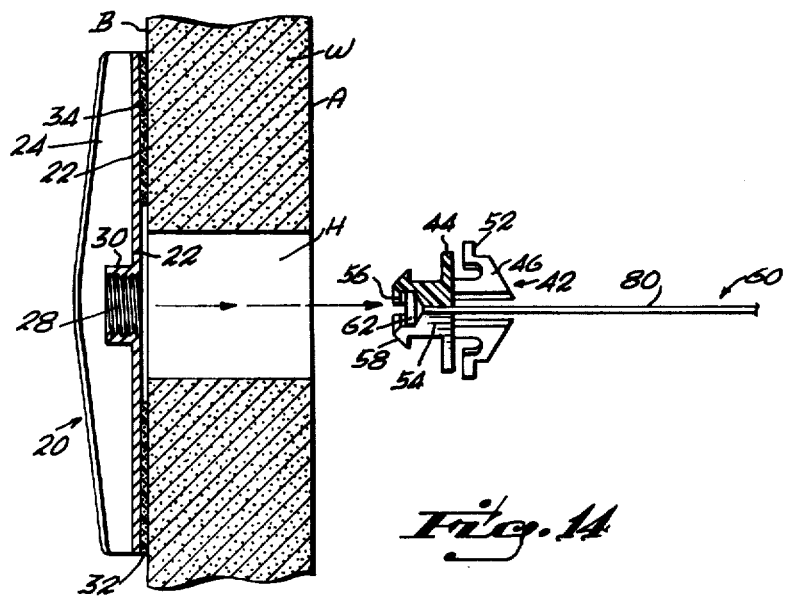

As illustrated in FIG. 14, the final phase of the pull forces flexes the angle fingers 58 inwardly for passage through the threaded nut hole 28 resulting in complete removal of the flexible line 60, centering plug 42 and the tape cover strip 36.

The centering plug 42 is formed of any resilient or flexible material such as a suitable plastic, in a manner whereby the feet portions 52 will be deformed inwardly under the influence of somewhat less pull forces than the angle fingers 58. Therefore, the proper sequential operations are accomplished, that is, first, centering plug 42 is properly positioned for removal of cover strip 36, second, the feet 52 of centering plug 42 is flexed to a position completely within wall hole H and the nut 20 is firmly secured against the blind wall side B with the threaded hole 28 in axial alignment with wall hole H and, third, the line 60, cover strip 36 and centering plug 42 are completely removed from wall hole H; all with a single pull by means of loop 66, of, for example only, approximately six to eight pounds of force. The nut 20 is permanently secured in place for reception of an appropriate fastening screw or bolt which can, at any time, be removed without disturbing the nut attachment to the blind side of the wall.

It is thus seen that the device may be considered to comprise an adhesive nut or universal labor-saving speed nut for quick and easy use which is not merely for a blind hole but for any hole where a quick method of providing threads is desired or required. Further, the device is not merely for hollow wall or ceiling use; but it is also highly useful in boats to repair stripped threads in fiberglass or in factory assembly problems. It is also a highly useful device in sheet metal work to provide stray threads in thin metal assemblies, for example in the aircraft industry or in air conditioning duck work.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In combination, a threaded fastening means and a device for attaching the fastening means to a blind, normally inaccessible wall surface relative to a hole of a predetermined diameter, preformed through the wall from an accessible side thereof comprising a nut sized and shaped for endwise passage through the wall hole and including a central internally screw threaded hole and at least two opposed outwardly extending projections sized to extend outwardly beyond the periphery of the wall hole when said screw threaded hole and wall hole are axially aligned, a pair of tape lengths of the pressure sensitive type, provided with adhesive material on both sides thereof, secured on first sides to the respective outwardly extending projections, outwardly of said threaded hole, and with the adhesive material of a second side thereof directed toward the blind surface, when the wall hole and said screw threaded hole are in axial alignment, a cover strip normally engaged on said second side adhesive material of both of said tape lengths and including a continuous span portion connecting therebetween, centering means removably engaged through said screw threaded hole and including positioning means and retainer means, an elongated nut mounting means including a first inner portion of a predetermined length slidably engaged through an axial hole through said centering means and including an enlarged disc on its inner end, a second, outer portion including a grip means on its outer extended end, and a third, intermediate portion connecting between said first and second portions, including means in engagement with said cover strip span portion between said span portion and nut when said cover strip is engaged on said second side.

2. The combination as defined in claim 1 wherein said elongated nut mounting means comprises a relative thin flexible line.

3. The combination as defined in claim 1 wherein said nut includes an elongated base plate portion and a central screw threaded tubular portion at right angles to said face plate, comprising said internally screw threaded hole.

4. The combination as defined in claim 3 wherein said base plate includes a pair of opposed side, rearwardly extending rigidifying flanges.

5. The combination as defined in claim 3 wherein said centering means includes a main body portion sized for reception in said screw threaded hole and an enlarged peripheral flange for engagement against an outer face of said base plate.

6. The combination as defined in claim 5 wherein said centering means includes a plurality of radially disposed, forwardly tapered fins sized for engagement in an inner end portion of the wall hole to center said nut relative thereto.

7. The combination as defined in claim 6 including a radially outwardly extending flexible foot from a trailing end of each of said fins, said feet being sized for overlapping engagement with a peripheral portion of the blind wall surface, about the wall hole, when said nut is centered relative thereto, said flexible feet being positioned relative to said pressure sensitive tape so as to maintain a predetermined spacing therebetween when said nut and wall hole are in said centered condition.

8. The combination as defined in claim 7 wherein said centering means further includes an axially disposed socket in its inner end, defined by a plurality of flexible retainer fingers, comprising said retainer means, each of said fingers includes a radially outwardly angled trailing end portion, normally engaged over an inner end of said tubular portion.

9. The combination as defined in claim 8 wherein said elongated nut mounting means comprises a flexible member formed of a suitable plastic material such as nylon, said inner and outer portions thereof being in the form of single lines and said intermediate portion being in a bifurcated form, connected to said inner portion by means of transverse portion provided with a forwardly directed pin for engagement through a central hole in said span portion.

10. The combination as defined in claim 9 wherein said grip means comprises a finger grip loop whereby said flexible member is pulled outwardly with said nut engaged on said inner portion and inserted through the wall hole whereby, first, said nut is centered relative to the wall hole and said cover strip is peeled from said second side adhesive under the influence of a minimal degree of pull forces, second, said disc is pulled into said socket and flexible feet are flexed inwardly into the wall hole and said second side adhesive is engaged firmly against the blind wall surface on opposed sides of the wall hole under the influence of a greater degree of pull forces, to secure said nut thereto, and, third, said retainer fingers are flexed inwardly to free said centering means from said screw threaded hole for removal along with said cover strip, on said flexible member under the maximum degree of pull forces.

* * * * *